US005816772A

United States Patent [19]

Py

[11] Patent Number: 5,816,772

[45] Date of Patent: Oct. 6, 1998

[54] METHOD OF TRANSFERRING ARTICLES, TRANSFER POCKET AND ENCLOSURE

[76] Inventor: Daniel Py, 40 rue Franklin, 78100 St Germain En Laye, France

[21] Appl. No.: 705,354

[22] Filed: Aug. 29, 1996

[30] Foreign Application Priority Data

Sep. 4, 1995 [FR] France .................................. 95 10334

[51] Int. Cl.$^{6}$ .................................................. B65G 65/00

[52] U.S. Cl. ............................................ 414/786; 414/412

[58] Field of Search .................................... 414/412, 786; 83/171, 946

[56] References Cited

U.S. PATENT DOCUMENTS

| | | | |
|---|---|---|---|
| 4,557,825 | 12/1985 | Wittes et al. | 414/412 X |
| 5,074,951 | 12/1991 | Banco et al. | 83/171 X |
| 5,638,988 | 6/1997 | Rogers et al. | 414/412 X |
| 5,649,801 | 7/1997 | White | 414/412 |

FOREIGN PATENT DOCUMENTS

| | | | |
|---|---|---|---|
| 0 537 117 | 4/1993 | European Pat. Off. . | |
| 1506930 | 11/1967 | France . | |
| 860028 | 2/1961 | United Kingdom | 414/412 |
| 1146767 | 3/1969 | United Kingdom . | |

*Primary Examiner*—David A. Bucci

*Attorney, Agent, or Firm*—Kenyon & Kenyon

[57] ABSTRACT

Method of transferring articles (1) contained in a closed transfer pocket (4) into an enclosure, wherein a part S of the wall of the closed transfer pocket (4) is stuck onto a part of the enclosure, there is cut out in the said part S, and from the inside of the enclosure, an opening of sufficient area to allow the passage of the said articles (1), the periphery of the opening of the transfer pocket (4) remaining stuck to the enclosure, and a corresponding opening (13) is made in the enclosure and the said articles (1) are then transferred into the enclosure through the said openings, pocket and enclosure for sterile transfer in particular.

15 Claims, 7 Drawing Sheets

METHOD OF TRANSFERRING ARTICLES, TRANSFER POCKET AND ENCLOSURE

The present invention relates to a method of transferring articles, a pocket specially designed for making this transfer and an enclosure also specially designed for making the said transfer.

In many cases, it is desirable to transfer articles from one place to another, without the latter being subjected to the action of the atmosphere or of the environment though which they pass. An example of such a transfer of particular interest is the transfer of sterilized objects into a sterile enclosure; another example is the transfer of articles in a certain gaseous atmosphere, for example nitrogen or argon, into an enclosure containing nitrogen or argon, whilst passing through a normal atmosphere.

A method of transferring articles is always being sought which guarantees absolute protection of these articles from the atmospheres through which they pass. This method should preferably be simple and inexpensive.

A known transfer technique is for example the one described in EP-A-0 505 269 which consists, in order to transfer products from a contaminated enclosure into a second enclosure without contaminating the latter, in bringing alongside the contaminated enclosure a transport container in which there is placed an empty transfer pot.

With regard to safety systems designed for such transfers, EP-A-0 586 307 may also be quoted which describes a centralized control mechanism with built-in safety arrangements designed for a device with a double door for sealed transfer between two closed volumes.

However, this system does not provide entire protection from contamination during the transfer, because of the section of the joints of the double door, previously exposed to the non-sterile environment, or because of the section of the joints fatigued by the repeated sterilizations of the transfer container.

EP-A-0 537 117 describes an equipment for forming a temporary connection for the transfer of objects between discontinuous confined volumes and a method in which there is applied a connector provided with a special membrane over a window which is also provided with a special membrane installed on a compressible ring, the said window comprising a cutting annular structure. However, the transfer chamber has a rather complex structure at the level of the connector. Furthermore, after use, the connector becomes useless unless it is reconditioned (replacement of the cut membrane, re-sterilization, . . . .

That is why the subject of the present invention is a method of transferring articles contained in a closed pocket called the "transfer" pocket into an enclosure, characterized in that a part S of the wall of the closed transfer pocket is stuck onto a rigid part of the enclosure, in that there is cut out in the said part S from the outside or preferably from the inside of the enclosure, an opening of sufficient area to allow the passage of the said articles, the periphery of the opening of the transfer pocket remaining stuck to the enclosure, in that a corresponding opening is made in the enclosure and in that the said articles are then transferred into the enclosure through the said openings.

The articles to be transferred can be of any nature, and for example can be sterile medical equipment, high precision equipment protected from particles and more particularly components of the packaging of a medicine, such a pumps, bottles, phials, syringes, etc. . . .

"Pocket" refers to a flexible or semi-rigid bag essentially formed from an envelope.

The transfer pocket can be of any nature adapted to protect the articles to be transferred from the action of the atmosphere or atmospheres which the latter have to pass through. The more particularly chosen pockets are those whose nature is such that they can be traversed by gamma radiation for the purpose of obtaining the sterility of the contents of the said pocket whilst protecting the said articles from contamination after the action of the radiation. Pockets are also chosen whose nature is permeable to the action of ethylene oxide. The transfer pocket is preferably made from a plastic material like those used for example for packaging sterile articles such as probes, syringes, needles, etc. . . and which are particularly suitable for sterilization by gamma radiation, in particular a plastic material which easily melts when heated.

The enclosure into which the said articles are transferred is in particular any protected or decontaminated enclosure, such as a sterile enclosure, in particular an enclosure of Class 10 level (less than 300 particles per $m^3$). This can be an enclosure containing a controlled atmosphere such as an enclosure containing an inert atmosphere such as nitrogen, argon, etc. . . .

According to the invention, a part S of the wall of the closed transfer pocket enclosing the articles to be transferred is stuck onto a rigid part such as a wall of the enclosure. In order to facilitate close adhesion, it is understood that the part of the enclosure onto which the wall of the transfer pocket is stuck is substantially flat or at least free from pronounced reliefs. In the case in which the wall and the enclosure are stuck by gluing, this gluing can be in the shape of a disk or can for example be annular.

Then there is cut out, in particular from the inside of the enclosure, an opening of sufficient area to allow the passage of the said articles, the periphery of the opening of the transfer pocket remaining stuck to the enclosure.

Although the said cutout is produced in practice from the inside of the enclosure, given that the latter is generally of much greater size than the transfer pocket, there is nothing to prevent the opening from being produced from the inside of the transfer pocket, considering its flexibility. For example, the latter can enclose a cutting object which, because of the flexibility of the transfer pocket, can be grasped from the outside and which can then be used to produce the cutout.

The rigid part of the enclosure on which a part of the wall of the transfer pocket must be stuck can be made from a material whose nature allows it to be cut, for example with the help of a cutting object; it is then possible to make an opening of the same size and at the same time in the wall of the transfer pocket and in that of the enclosure.

However, in a preferred embodiment of the invention, the part S is stuck onto a rigid window formed in the enclosure and constituting the desired opening into the enclosure.

In a preferred embodiment, the stuck part S entirely covers the window and at least its periphery over a certain width. As mentioned above, this stuck part can for example be disk-shaped or annular.

This width can for example be greater than 0.5 cm, preferably greater than 1 cm and generally of the order of 2 to 5 cm, even though there is no mandatory upper limit except for that determined by utility.

In an especially preferred embodiment, the window itself comprises means for cutting the external wall of the transfer pocket.

"Window" is understood to refer to an element of the enclosure, articulated or not articulated, capable of efficiently and hermetically obturating the corresponding opening for the purpose of constituting an effective barrier against the external atmosphere, in particular against micro-organisms.

These cutting means can be of any known type, for example a blade, particularly of circular shape, which is retracted at the time of sticking and which can, for example by means of pressure, be made to protrude from the said window in order to produce the cutout.

In order to facilitate the latter, the said circular cutting blade can for example be capable of rotation.

Instead of a circular blade, it is also possible to use a blade like that of a knife, a scalpel or any contusive means capable of operating in a continuous manner in a wall, in combination or not with any appropriate device allowing the said blade to be displaced, for example with a circular movement, in order to produce a corresponding cutout in the transfer pocket.

In an especially preferred embodiment, the cutting means comprise a means capable of destroying pathogenic micro-organisms which may be present at the location of the cutting, such as a heating device; a heating blade is therefore used. The latter does not necessarily have to be cutting, if the nature of the transfer pocket makes it possible to produce the cutout by melting the material of the transfer pocket.

Insofar as the periphery of the opening produced in the transfer pocket is stuck to the periphery of the window, cutting out in the way described above provides protection against any possible external contamination, including protection against any contamination coming from the melted circumference which is sterilized by the hot metal during the melting.

It can therefore be seen that it is not necessary for the external surface of the enclosure on which the transfer pocket is stuck and the external surface S of the transfer pocket to be sterilized, which is a noteworthy advantage of the invention. It is on the other hand necessary for the opening to be produced within the continuity of the stuck zones.

The closed transfer pocket containing the articles is itself preferably contained inside another pocket which is also closed. The advantage of this is additional safety ensuring that the opening of this sterile bag makes it possible to deliver into the sterile enclosure products which are perfectly free from all forms of contamination: microbial, chemical, particulate, or others.

The articles to be transferred may themselves be contained in a closed pocket, called an "internal pocket", which is itself contained inside the closed transfer pocket intended to be stuck to the enclosure.

The sticking of the transfer pocket to the enclosure can be carried out as follows:

In a first variant in which the sticking is a gluing, the window and its periphery are treated with an adhesive product, then a part S of the wall of the transfer pocket is stuck onto this part.

It is then possible to provide a certain protection of this zone, which in maintained in a laminar flow for example.

It is also possible to produce the sterility of the latter and to protect it by means of a protective film. The latter will in particular be applied onto the bag coated with adhesive before producing the sterility of the film-adhesive surface assembly.

In a preferred embodiment, the adhesive is applied onto the transfer pocket. As above, it is possible to treat the wall of the transfer pocket using an adhesive, or the transfer pocket can originally include an adhesive section, preferably protected by a protective film.

In a particularly preferred embodiment, a flat rigid frame is installed inside the transfer pocket before it is closed. This makes it possible to produce a flat surface on the transfer pocket, like a drum, which is easy to stick onto a flat surface of the enclosure.

In a particularly preferred embodiment, the flat frame is provided with a peripheral groove, making it possible to stretch the part S of the wall of the transfer pocket, like the skin of a drum, for example by using a tie, preferably elastic, installed in the said groove.

Thus, and at any time, even when the transfer pocket is already closed, it is possible to press the frame against a part of the wall of the transfer pocket, to stretch the latter over the frame, and to install around the periphery of the latter an elastic or non-elastic tie, provided or not provided with a mechanical tightener, in order to produce a kind of tambourine.

If the transfer pocket comprises a pre-existing adhesive surface, protected or not protected by a protective film, this operation is carried out where the adhesive is. It is also possible, once this kind of tambourine has been obtained, to treat its surface with an adhesive which is possibly, and preferably, protected with a protective film which can be sterilized if desired, either as it is or after it has been installed in another pocket called the "external pocket".

The sticking can also be obtained by other means, in particular by magnetic means. In this case, the part of the enclosure on which the pocket is stuck and the transfer pocket are provided with magnetic means. It is possible for example to place a magnetic disk or a concentric disk and ring inside the pocket, whilst the corresponding part of the enclosure is made of a magnetic metal such as steel, or a disk made of magnetic metal or of magnetic plastic material can be placed inside the pocket, whilst attraction means, a magnet or an electromagnet, are provided on the enclosure.

It is of course possible to combine gluing and magnetic attraction when it is desired to strengthen the adhesion between the pocket and the enclosure.

The invention also relates to a transfer pocket specially designed for using the transfer method as defined above, characterized in that it comprises a rigid flat frame provided with a peripheral groove, a part S of the wall of the transfer pocket being stretched over this frame like a drum skin with the help of a tie, preferably elastic, installed in the said groove.

In a preferred embodiment, the said flat frame has an oval or preferably circular shape. Any other shape, such as square, rectangular or polygonal, can be used but in this case it is preferable to avoid the use of sharp corners and because of this the corners are preferably rounded.

In another preferred embodiment of the transfer pocket, the flat frame is extended towards the inside, for example it extends towards the centre if this frame is circular, in order to constitute a barrier to a contusive means of opening or to a heating means such as a laser beam, preventing the propagation of the latter into the transfer pocket containing the objects to be transferred.

Preferred transfer pockets according to the invention comprise a part S which is adhesive or which is rendered adhesive, preferably protected with a protective film.

The invention also relates to an enclosure designed for the use of the method described above, characterized in that it comprises a flat window with coplanar framing, the said window being able to be provided with at least one means of cutting the part S of the wall of the transfer pocket, without necessitating the opening of the said window.

The means of cutting the part S of the wall of the transfer pocket are in particular those mentioned above but they are preferably localized on the outer rim of the opening. Cutting means are preferred which are heating means, protruding through the widow, and in particular producing the cutout by melting.

In order to facilitate the placing of the part S of the transfer pocket on the window and better adhesion, an enclosure is preferred which is characterized in that the window furthermore comprises means of strengthening the adhesion, preferably suction means or magnetic attraction means, possibly as well as the framing of the window, allowing good adhesion of the part S of the wall of the transfer pocket to the enclosure at the level of the window.

Furthermore, latches can be provided around the window, for example 3, 4 or 5 of them, making it possible to lock, and also preferably to centre, the tambourine with respect to the window. These latches strengthen the adhesion of the transfer pocket to the enclosure. They can also serve as safety arrangements in the sense that as long as they are not closed over the tambourine, it is impossible to open the window. These safety arrangements can for example be obtained by electrical contacts made when the latches are closed.

One means of implementing the invention is as follows in the case of transferring sterile objects into a sterile enclosure.

The articles to be sterilized are placed in a first pocket called the "internal pocket" which is closed and, if desired, provided with a sterilization indicator. In the transfer pocket there is placed, on the one hand, the internal pocket containing the articles and, on the other hand, a flat circular frame provided with a peripheral groove. This transfer pocket is then closed and the surface of a part of the said transfer pocket is stretched over the frame, and this part is kept stretched by means of an elastic band placed in the peripheral groove. An adhesive is then placed on this part and it is provided with a protective film. If desired, this pocket is also provided with a sterilization indicator. Preferably, the assembly is then placed in another pocket, called the "external pocket" and the whole is subjected to sterilization by gamma radiation.

The assembly of three pockets is then transported to the enclosure in which the articles must be placed. The external pocket is then opened and, if desired, it is checked, by means of the indicator or indicators, that the sterilization has been carried out correctly. The part S of the transfer pocket is placed opposite the window and, after having withdrawn the protective film, this part is stuck to the window after having started up the suction device with which the latter is provided. Preferably, the enclosure is provided with guides making it possible to correctly position the frame opposite the window. Thus the transfer pocket is perfectly stuck to the window of the enclosure. The cutting out of an opening in the part S of the transfer pocket is then carried out by pushing a handle with which the window is provided on its internal side which causes cutting and heating blades to protrude outside the window and at the same time makes an electrical contact allowing the said device to be heated up sufficiently to melt the wall of the transfer pocket. Thus, at the same time as the cutout is being produced, the microorganisms which may be present at the level of the said cutout are destroyed; the other microorganisms are blocked or killed by the glue, given that the wall of the transfer pocket is stuck up to the edge of the window. It is then possible to proceed with the opening of the window, and with the transfer of the articles. The opening of the window and the transfer of the articles can be carried out for example by using sleeves with which the enclosure is provided, allowing the manipulator's arms to be inserted in these sleeves in order to carry out the desired manipulations. Such enclosures are for example of the type used for caring for immunodepressed persons who must be placed in a sterile atmosphere or for carrying out dangerous manipulations or manipulations of toxic substances, in particular when handling microorganisms or toxins.

Once the transfer is completed, the window can be closed and then the transfer pocket which was used for the transfer can be removed by tearing off the part stuck to the window and which is integral with the frame.

The pocket and the method according to the present invention also have other advantages which will be seen below.

In fact, the system described above of a flexible pocket containing or not containing a frame also makes it possible, at the end of the operation, after the transfer of the articles originally present, to transfer or to re-transfer, in particular in a perfectly sterile manner, articles, and in particular sterile articles, from the enclosure into the pocket whilst it is still stuck to the enclosure.

Once these latter articles have been placed inside the pocket (for example objects like the waste material produced by cutting, empty bags or other materials), it is possible to close the door again and it is also possible to close the pocket again, for example by fitting on the latter a conventional tying means known in the prior art, such as a cord, an adhesive tightening tape, a sliding ring with a non-return system, etc. . . . The pocket can then be detached from the enclosure.

Depending on the case it is then possible, if the materials to be discarded have been put in before the tying operation, to remove the latter whilst retaining the materials to be protected which are placed in the pocket but after the tying. It is also possible to use the same pocket several times for transferring the articles it contains for example into another enclosure provided with a device such as described above whilst avoiding manipulations. The said articles can, for example, be the original but modified products, or other articles having nothing in common with the previous ones except for being present in the enclosure. As many operations of this type as desired can be carried out provided that the available surface of the pocket is still sufficient.

The present application also relates to a method such as defined above, characterized in that, furthermore, after the transfer of the original articles into the enclosure, other articles or the same articles possibly after modification are placed in the transfer pocket, the pocket is tied between the said articles and the enclosure and a new transfer is carried out.

As those skilled in the art will realise immediately, for certain functions the frame and the enclosure have symmetrical roles. For example, means of cutting by heating can be provided on the frame and not on the outer rim of the opening as shown in the figures: in this case, the cutout is produced from the outside and not from the inside of the enclosure.

The application therefore also relates to a frame such as referred to above and provided with cutting means as described above.

Those skilled in the art will also realise that it is possible to make a transfer in a similar manner between two enclosures by using a pocket provided for example with two frames, or a transfer between two pockets by using an intermediate enclosure provided with two entrances, such as two windows.

The invention will be better understood by referring to the accompanying drawings in which.

Figure 1:
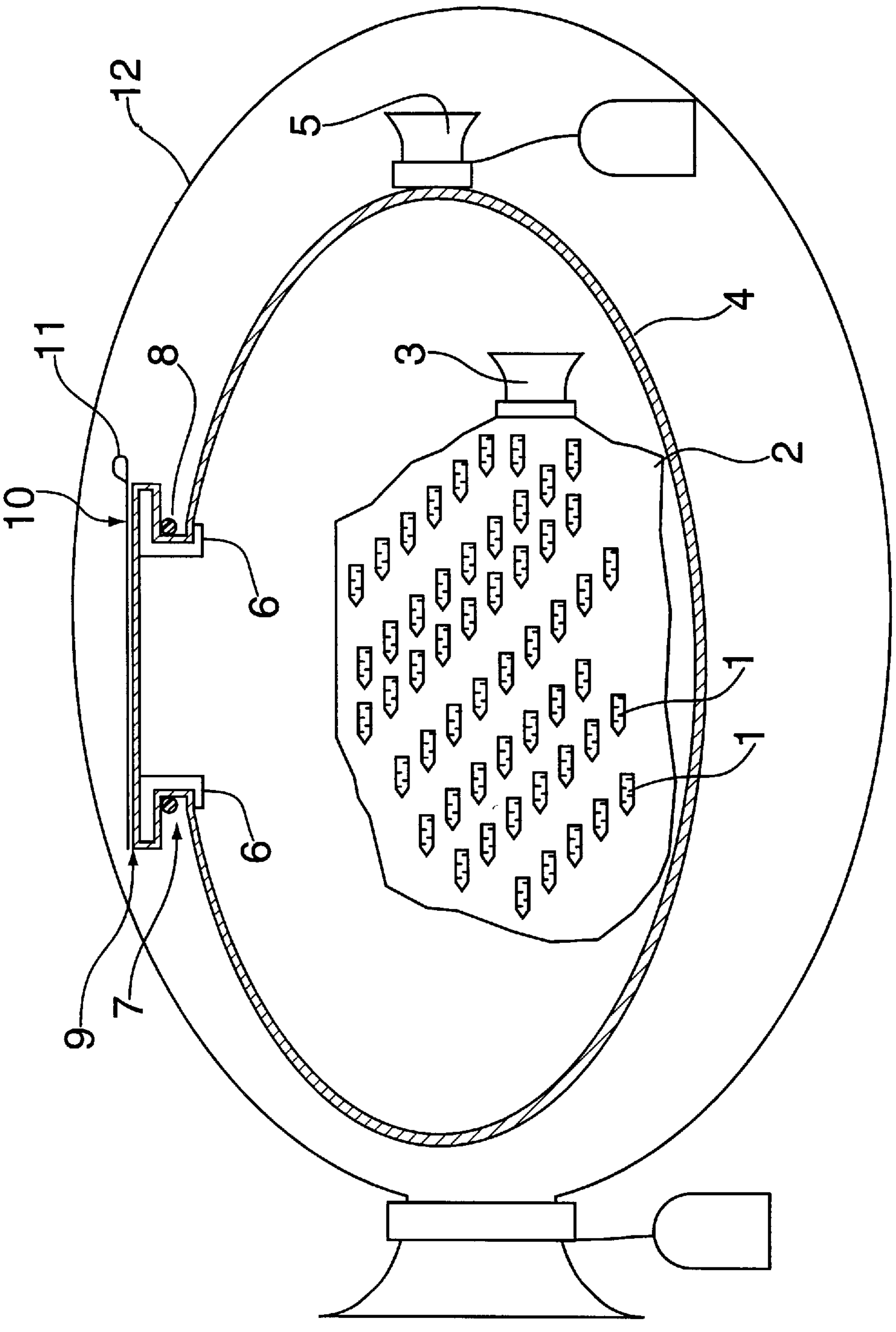
FIG. 1 is a diagrammatic view showing the three pockets, one inside the other, and a cross-section of the part S of the wall of the transfer pocket at the level of the frame.

In FIG. 1 it is possible to observe the articles to be transferred, in this case bottles 1 enclosed in an internal pocket 2 whose opening 3 has been obturated. This pocket 2 enclosing the articles 1 is itself placed in the closed transfer pocket 4 whose opening 5 has been obturated and provided with a sterilization indicator. In the top part of the drawing there can be seen the frame 6 determining a plane at its top and provided with a peripheral groove 7 in which a part of the wall of the closed transfer pocket 4 is retained by means of an elastic band 8. Thus the structure of a diametral cross-section of a frame has the general shape of a "U" of which one of the sides is shorter than the other. On the part S of the transfer pocket held by the frame there is placed an adhesive 9 protected by a protective film 10 provided with a tab 11. The frame and the articles enclosed in the internal pocket were of course placed inside the closed transfer pocket before it was closed. The said two pockets have themselves been placed inside a pocket called the "external" pocket 12, which is itself closed. This pocket 12, like the others, may be provided with a sterilization indicator and with identification devices such as bar codes.

Figure 2:
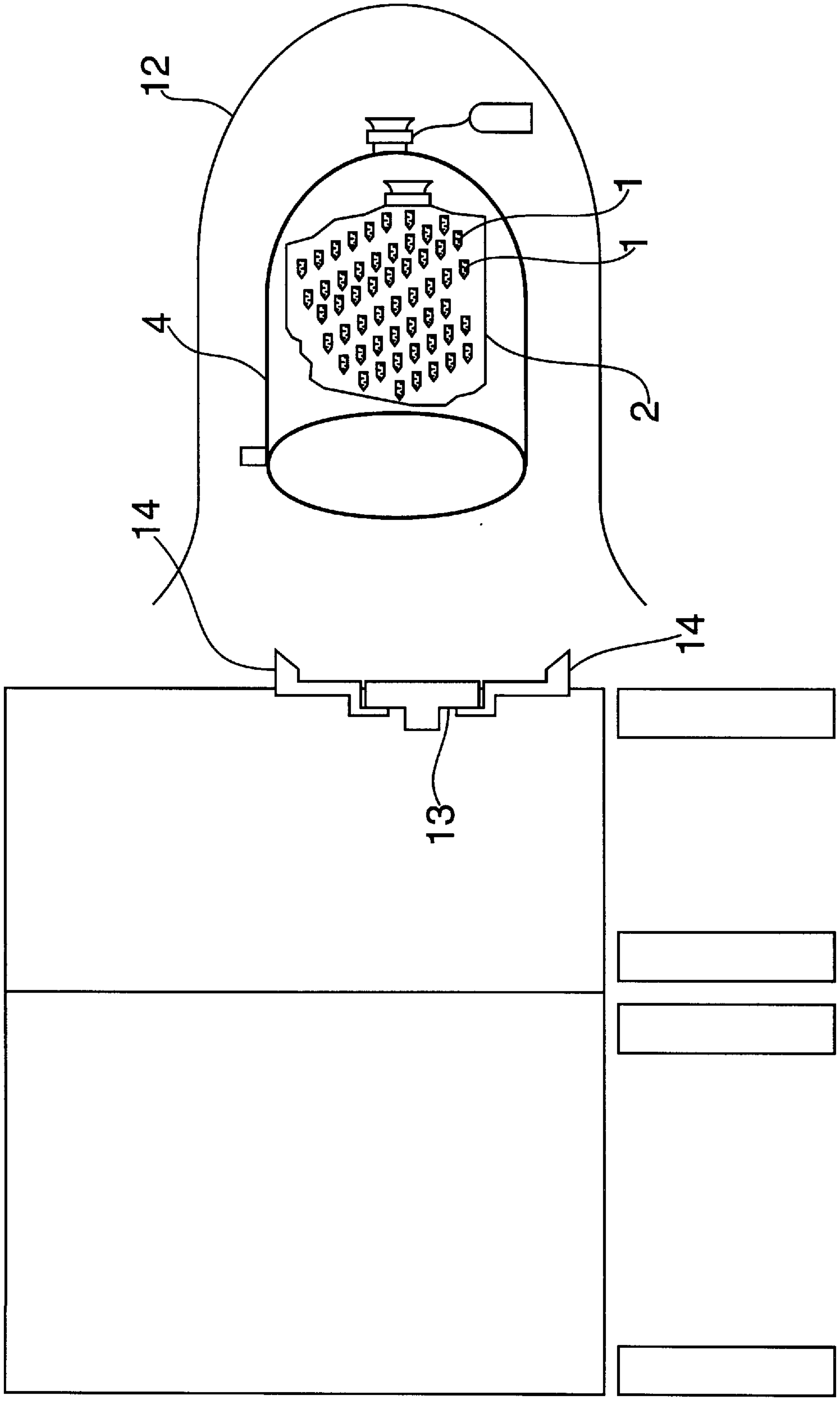
FIG. 2 is a diagrammatic view showing the positioning of the transfer pocket in front of an enclosure provided with a special window according to the invention.

On the left hand side of FIG. 2 there can be seen an enclosure according to the invention. The latter comprises a special zone, used for receiving the adhesive part S of the transfer pocket. In this special flat zone can be seen the window itself 13 and latches 14 used for fixing the frame against the enclosure.

In this figure it can also be seen that the external pocket 12 has been opened in order to place the surface S of the transfer pocket 4 opposite the window 13 of the enclosure.

Figure 3:
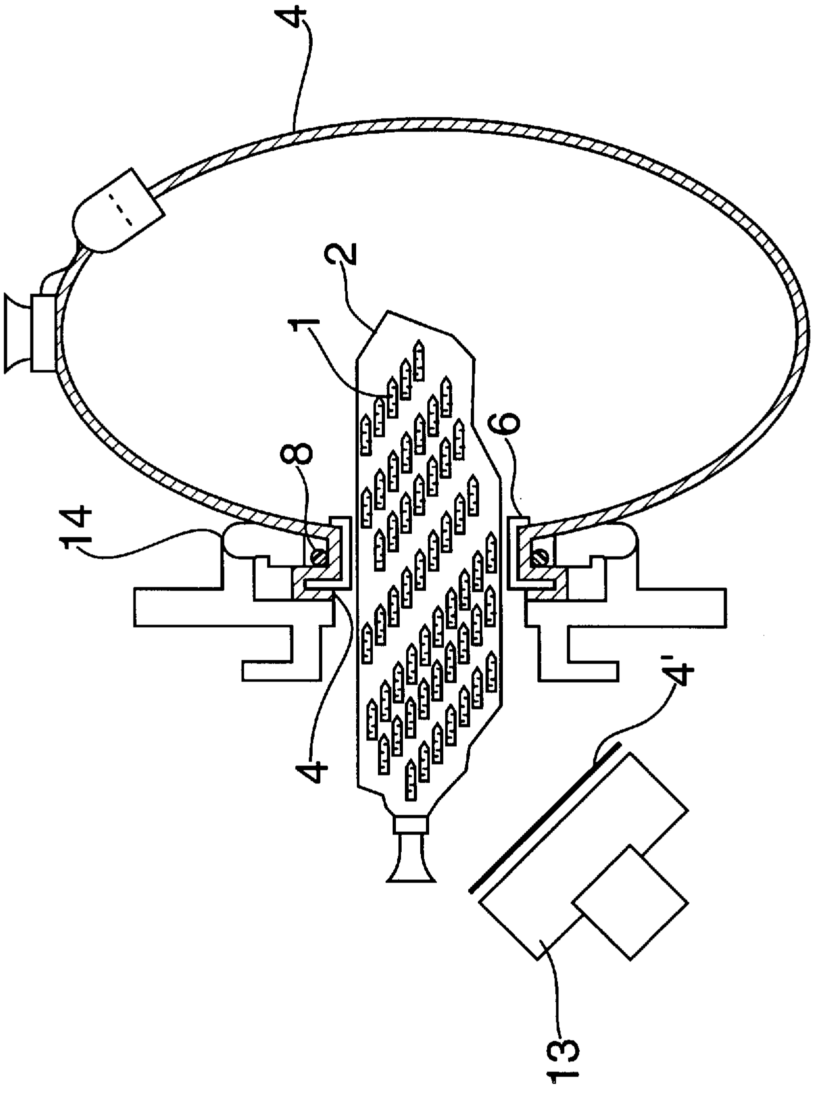
FIG. 3 is a diagrammatic representation showing the transfer of articles to the inside of the enclosure, after the window has been opened.

In FIG. 3 it can be seen that the window 13 has been opened, allowing the transfer of the internal pocket 2 containing the articles 1 from the closed transfer pocket 4 into the enclosure.

In this figure it can be seen that the latches 14 have been moved in such a way as to lock the frame 6 against the framing of the window. There can also be seen at this point the remainder of the wall 4 of the transfer pocket, of which a part 4' has remained stuck against the window 13. The wall 4 slightly overlaps the window towards the inside and remains stuck over the whole periphery of the latter.

The frame 6 can be made of magnetic metal whilst attraction means, electromagnetic for example, are provided on the framing of the window 13.

Figure 4:
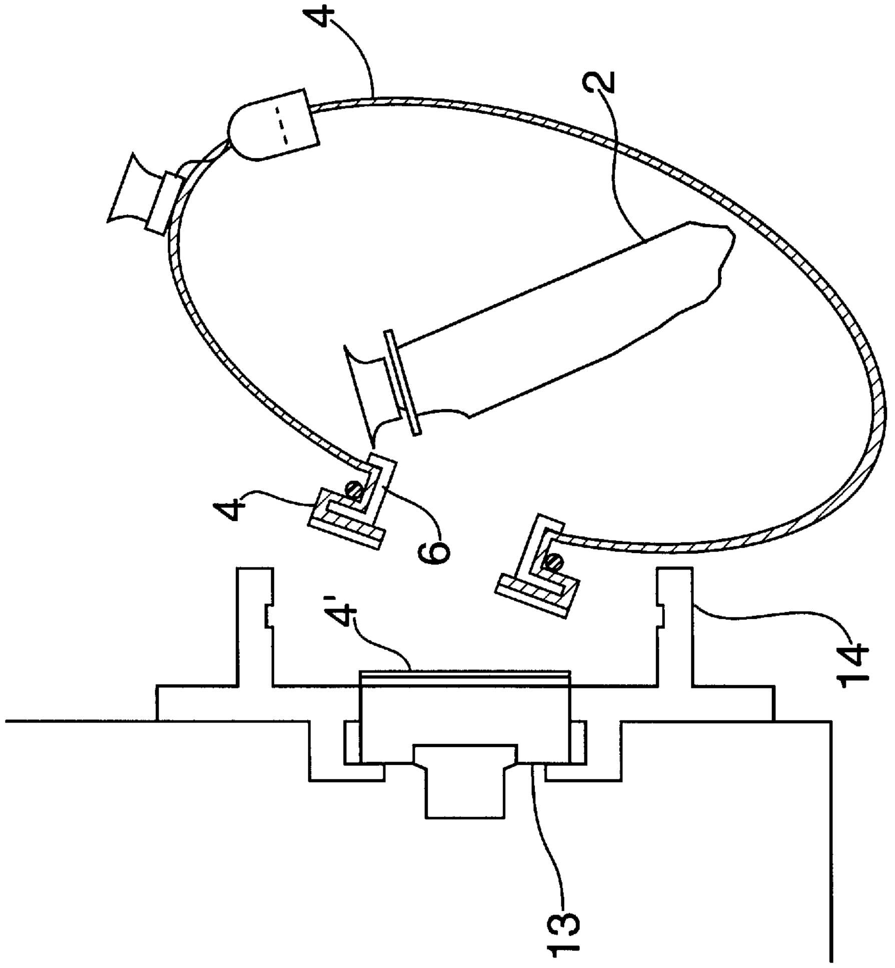
FIG. 4 is a diagrammatic representation showing the withdrawal of the transfer pocket after the transfer of articles and after the window has been closed again.

In FIG. 4 it can be seen that, after opening the internal pocket 2, the articles have been transferred into the enclosure and the internal pocket has been replaced in the transfer pocket 4. The latches 14 have been opened in order to release the frame 6 and to allow the transfer pocket 4 to be withdrawn. Previously, the window 13 was re-closed in order to maintain the sterility of the enclosure. It is then possible to remove possible traces of adhesive remaining on the window as well as the remainder 4' of the transfer pocket 4. Thus the enclosure and its window are ready for use again. Similarly, the frame 6 and the elastic band 8 can be retrieved to be used again with a new transfer pocket 4.

Figure 5:
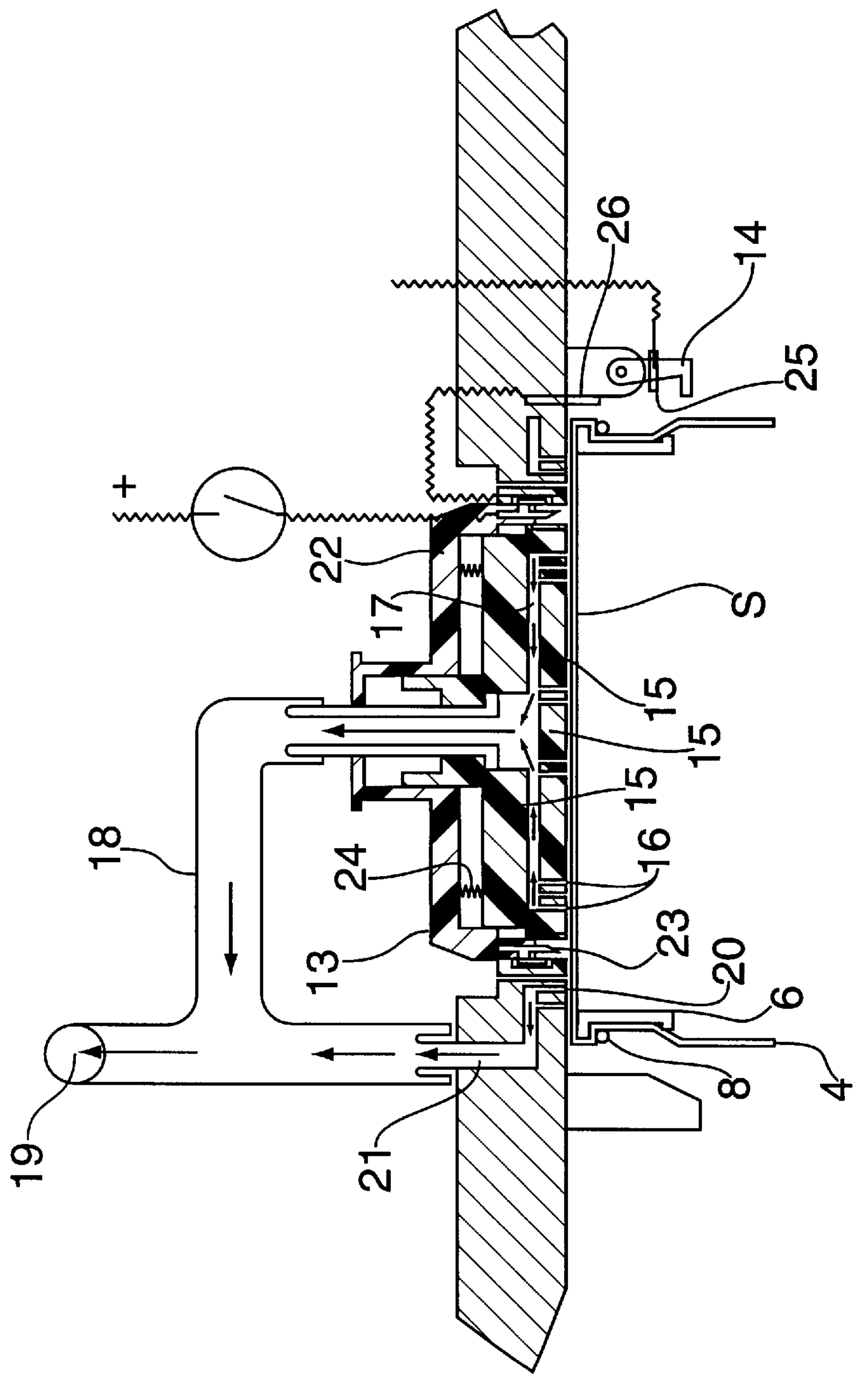
FIG. 5 is a detailed cross-section of the wall of an enclosure according to the invention and provided with a window.

FIG. 5 shows details of various elements at the level of the part of the enclosure designed for receiving a transfer pocket according to the invention. Firstly, there can be seen the pocket 4 held in a groove of the frame 6 by means of an elastic band 8. The part S of the transfer pocket 4 is pressed over the whole surface of the window 13 and beyond. The window 13 comprises a chassis 15 provided with suction holes 16 emerging on the outside of the enclosure. These suction holes are connected together and, towards the inside, form additional suction pipes 17 which are connected with the main suction pipes 18 going to the suction device 19 which can be located outside of the enclosure in order to avoid the undesired intake of gas, and/or can be provided, for example, with one or more sterilizing filters. There are also additional suction holes 20 and additional suction pipes 21 on the framing of the window. In this case the suction pipe is common to both the framing of the window and the window itself, but it is entirely conceivable to have separate suction pipes and devices.

The rear of the chassis of the window is provided with a handle 22 having a special function. This handle is capable of moving or of being moved from the inside towards the outside of the enclosure in such a way as to cause the springing out of heating blades 23 capable of protruding with respect to the surface of the window and of the framing. This protrusion is obtained by pressing on the handle which is mounted on the elastic devices represented here by springs 24. Thus, a pressure on the handle 22 makes it possible, on the one hand, to obtain an electrical contact causing the heating up of the heating blades and, at the same time, the protrusion of the latter.

In this figure there can also be seen a latch 14 in the articulated open position, which can be closed again in order to lock the frame 6 against the surround of the window. This latch 14 is provided with an electrical contact 25 capable of cooperating, after closing, with another electrical contact 26 located on the surround of the window, thus constituting a safety arrangement. If a latch (or the latches) are not closed, it becomes impossible to activate the heating blades and, furthermore, it preferably becomes impossible to open the window.

Figure 6:
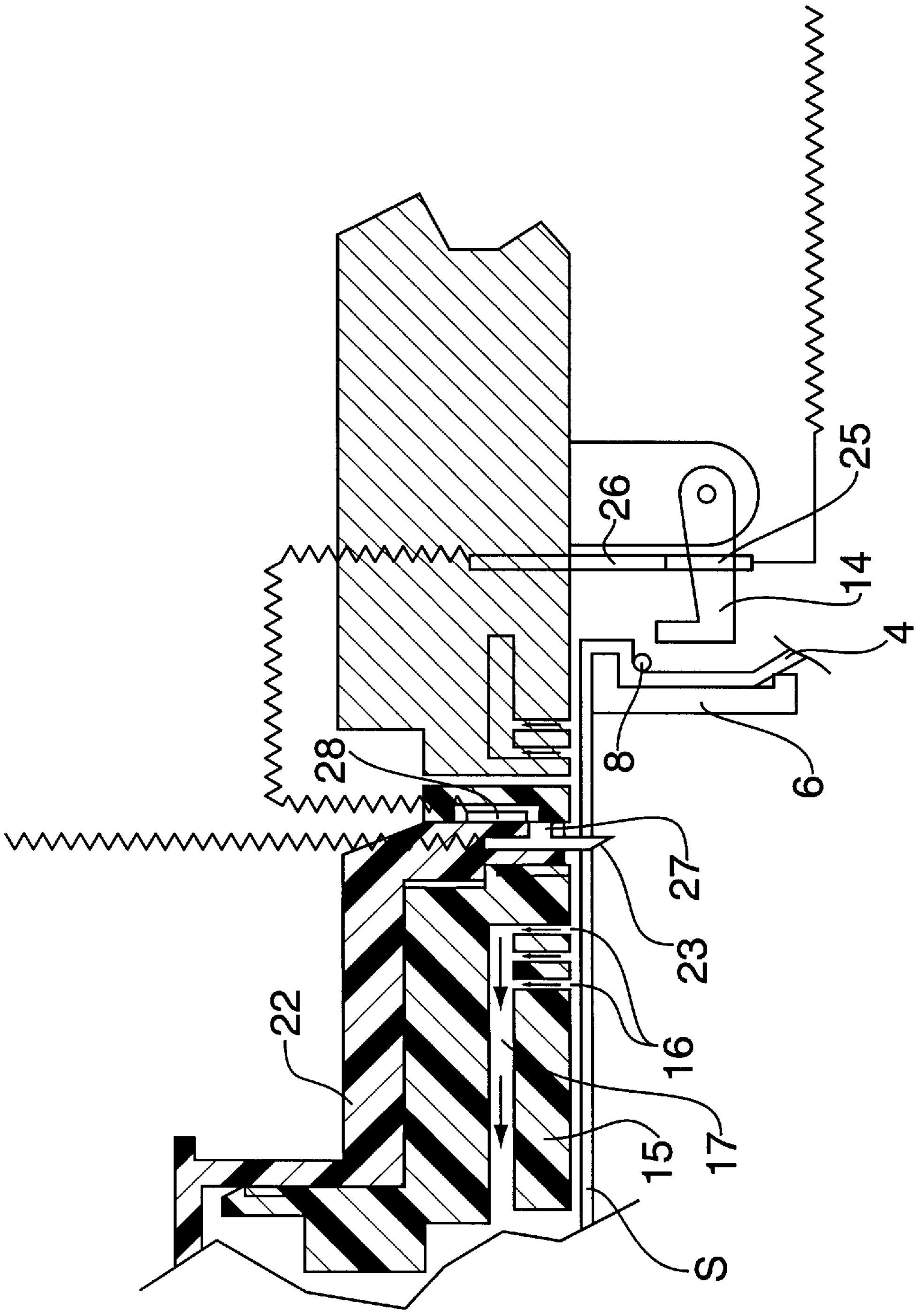
FIG. 6 is a detail of FIG. 5 showing, in particular, the suction channels, the heating blades and the electrical contacts which can be used for the implementation of the method.

In FIG. 6, in which the latch 14 is in the closed position, the formation of an electrical circuit according to the invention can be observed better. In this figure, an electrical contact has been made between the electrical contacts 25 and 26. Electrical continuity has therefore been able to be established so that the pressure on the handle 22 of the window has caused the protrusion of the heating blades 23 beyond the surface of the chassis 15 of the window and thus the cutting out by melting of an opening in the surface S of the transfer pocket 4. The heating up has been obtained by cooperation between an electrical contact 27, with which the heating blade or its support is provided, and another electrical contact 28, with which the chassis of the window is provided, establishing electrical continuity. It can also be seen that the edge of the transfer pocket 4, after cutting, overlaps toward the inside of the opening of the window.

Figure 7:
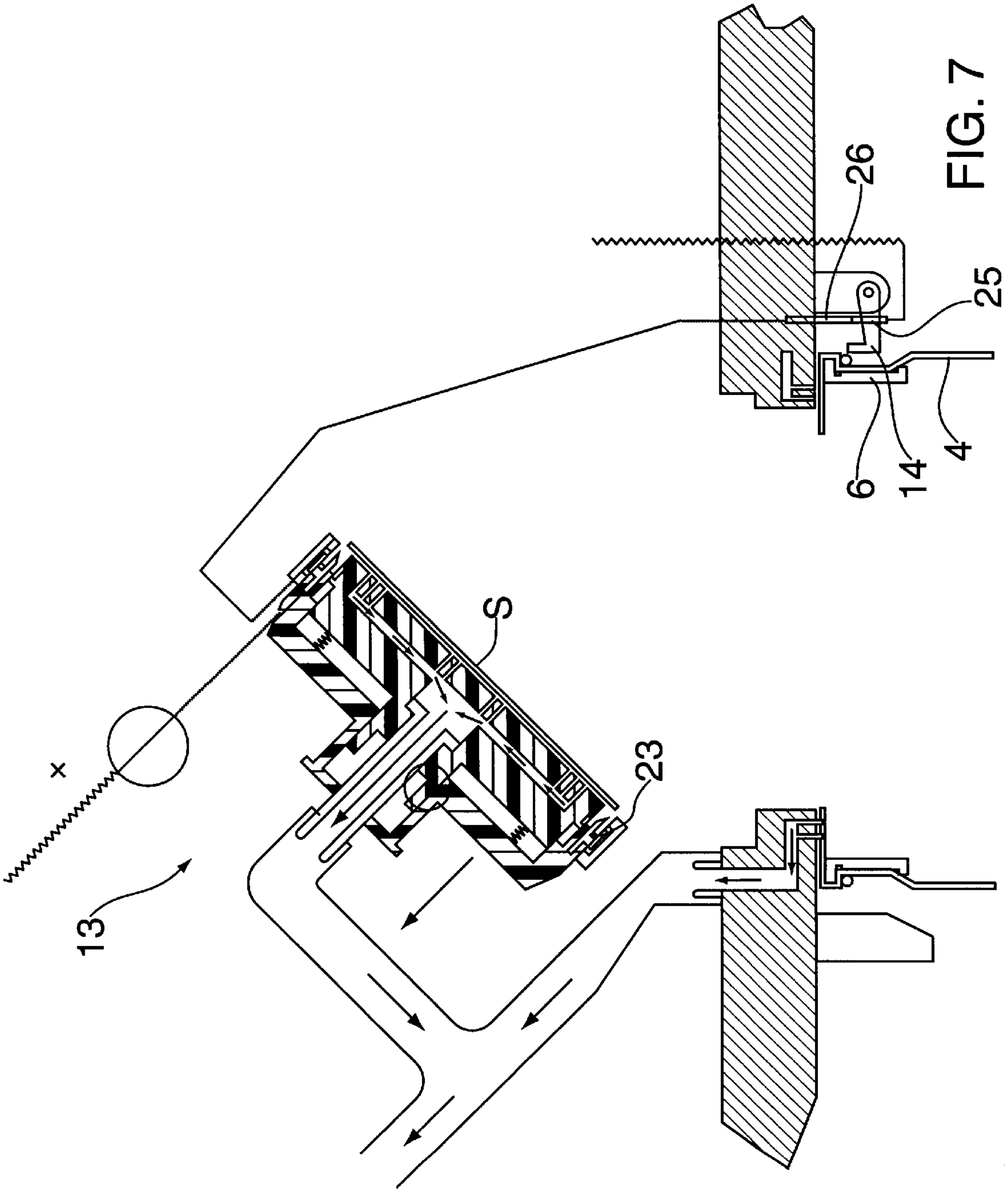
FIG. 7 is also a diagrammatic cross-sectional representation of an enclosure wall and of a window according to the invention in the open position after the opening of a transfer pocket.

In FIG. 7, the opening phase of the window and of the transfer pocket can be seen. It can be seen that the window 13 has carried away with it a part S of the wall of the transfer pocket 4 which has been cut out at the level of the heating blades 23. Continuity is thus established between the inside of the transfer pocket 4 and the inside of the enclosure, allowing the transfer of articles from the transfer pocket 4 into the said enclosure.

I claim:

1. A method of transferring articles (1) contained in a closed transfer pocket (4) into an enclosure, comprising:

attaching a part S of a wall of the closed transfer pocket (4) onto a rigid part of the enclosure, wherein said part S has been rendered adhesive to facilitate said attachment, and wherein said attachment is aided by one of suction means and magnetic means;

cutting out an opening in the part S, either from inside or from outside of the enclosure, said opening being of sufficient area to allow for passage of the articles (1), wherein the periphery of the opening of the transfer pocket (4) remains stuck to the enclosure;

making a corresponding opening (13) in the enclosure; and transferring the articles (1) into the enclosure through the openings.

2. The method according to claim 1, wherein the part S is stuck onto a rigid window (13) formed in the enclosure.

3. A pocket for use in transferring articles into an enclosure according to the method of claim 1, said pocket comprising:

a rigid flat frame (6) provided with a peripheral groove (7); and a wall having a part S stretched over the frame (6) by a tie (8) disposed in the groove (7), said part S being juxtaposed to said enclosure during transfer of articles into said enclosure;

wherein the part S is adhesive or is rendered adhesive.

4. A pocket for use in transferring articles into an enclosure according to the method of claim 1, said pocket comprising:

a rigid flat frame (6) provided with a peripheral groove (7); and a wall having a part S stretched over the frame (6) by a tie (8) disposed in the groove (7);

wherein the frame (6) includes means (23) for cutting out at least a portion of said part S of the wall of the transfer pocket.

5. An enclosure for use in transferring articles according to the method of claim 1, said enclosure comprising:

a flat window (13) with a coplanar framing having at least one means (23) for cutting a part S of a wall of the transfer pocket (4) which juxtaposes said window (13) during transfer of said articles, without necessitating opening of said window (13), the cutting means (23) comprising heating means protruding through the window (13).

6. The enclosure according to claim 5, wherein the window (13) further comprises one of suction means (16, 17, 18, 19) and means for magnetically attracting the part S of the wall of the transfer pocket for adhering the part S of the wall of the transfer pocket (4) to the enclosure.

7. The method of transferring articles according to claim 1, wherein articles are transferred between two pockets, and wherein the second pocket functions as the enclosure.

8. The method of transferring articles according to claim 1, wherein the articles are transferred between two enclosures.

9. A method of transferring articles (1) contained in a closed transfer pocket (4) into an enclosure, comprising:

sticking a part S of a wall of the closed transfer pocket (4) onto a rigid part of the enclosure;

cutting out an opening in the part S, either from inside or from outside of the enclosure, said opening being of sufficient area to allow for passage of the articles (1), wherein the periphery of the opening of the transfer pocket (4) remains stuck to the enclosure;

making a corresponding opening (13) in the enclosure; and transferring the articles (1) into the enclosure through the openings, wherein the part S is stuck onto a rigid window (13) formed in the enclosure, and wherein the window (13) includes means (23) for cutting out the external wall of the transfer pocket.

10. The method according to claim 9, wherein the cutting out means (23) include a means for destroying pathogenic organisms.

11. A method of transferring articles (1) contained in a closed transfer pocket (4) into an enclosure, comprising:

sticking a part S of a wall of the closed transfer pocket (4) onto a rigid part of the enclosure;

cutting out an opening in the part S, either from inside or from outside of the enclosure, said opening being of sufficient area to allow for passage of the articles (1), wherein the periphery of the opening of the transfer pocket (4) remains stuck to the enclosure;

making a corresponding opening (13) in the enclosure;

transferring the articles (1) into the enclosure through the openings; and closing the window (13) after the transfer of the articles (1) and before withdrawing the transfer pocket (4).

12. A method of transferring articles (1) contained in a closed transfer pocket (4) into an enclosure, comprising:

sticking a part S of a wall of the closed transfer pocket (4) onto a rigid part of the enclosure, wherein the closed transfer pocket (4) includes a rigid flat frame (6) positioned at the part to be stuck at the time of the sticking onto the enclosure;

cutting out an opening in the part S, either from inside or from outside of the enclosure, said opening being of sufficient area to allow for passage of the articles (1), wherein the periphery of the opening of the transfer pocket (4) remains stuck to the enclosure;

making a corresponding opening (13) in the enclosure; and transferring the articles (1) into the enclosure through the openings.

13. A method of transferring articles (1) contained in a closed transfer pocket (4) into an enclosure, comprising:

sticking a part S of a wall of the closed transfer pocket (4) onto a rigid part of the enclosure;

cutting out an opening in the part S, either from inside or from outside of the enclosure, said opening being of sufficient area to allow for passage of the articles (1), wherein the periphery of the opening of the transfer pocket (4) remains stuck to the enclosure;

making a corresponding opening (13) in the enclosure;

transferring the articles (1) into the enclosure through the openings;

after the transfer of the original articles (1) into the enclosure, placing new articles in the transfer pocket (4);

tying the transfer pocket (4) between said new articles and the enclosure such that said new articles are isolated from the enclosure by the pocket (4); and carrying out a new transfer using the same pocket.

14. A method of transferring articles (1) contained in a closed transfer pocket (4) into an enclosure, comprising:

attaching a part S of a wall of the closed transfer pocket (4) onto a rigid part of the enclosure;

cutting out an opening in the part S using cutting means (23) formed on one of said transfer pocket (4) and said enclosure, said opening being of sufficient area to allow for passage of the articles (1), wherein the periphery of the opening of the transfer pocket (4) remains stuck to the enclosure;

making a corresponding opening (13) in the enclosure using said cutting means (23); and transferring the articles (1) into the enclosure through the openings.

15. The method according to claim 14, wherein said part S has been rendered adhesive to facilitate said attachment, and wherein said attachment is aided by one of suction means and magnetic means.

* * * * *